(12) United States Patent
Srinivasan et al.

(10) Patent No.: US 12,432,114 B1
(45) Date of Patent: Sep. 30, 2025

(54) APPARATUS, SYSTEM, AND METHOD FOR INTELLIGENT POWER MANAGEMENT OF UNDERUTILIZED PACKET FORWARDING DEVICES

(71) Applicant: Juniper Networks, Inc., Sunnyvale, CA (US)

(72) Inventors: Eswaran Srinivasan, Fremont, CA (US); Moshiko Nayman, Manalapan, NJ (US); Truman Joe, Stanford, CA (US); Sridatta Bairy, Kanata (CA)

(73) Assignee: Juniper Networks, Inc., Tempe, AZ (US)

( * ) Notice: Subject to any disclaimer, the term of this patent is extended or adjusted under 35 U.S.C. 154(b) by 0 days.

(21) Appl. No.: 18/341,743

(22) Filed: Jun. 26, 2023

(51) Int. Cl.
*H04L 41/0833* (2022.01)
*H04L 45/60* (2022.01)

(52) U.S. Cl.
CPC .......... *H04L 41/0833* (2013.01); *H04L 45/60* (2013.01)

(58) Field of Classification Search
CPC .................................................. H04L 41/0803
See application file for complete search history.

(56) References Cited

U.S. PATENT DOCUMENTS

| | | | |
|---|---|---|---|
| 10,298,456 B1* | 5/2019 | Chang | G06F 1/3234 |
| 2011/0235549 A1* | 9/2011 | Ahlers | H04L 41/12 370/255 |
| 2012/0269126 A1* | 10/2012 | Wang | H04W 52/0251 370/328 |
| 2014/0226525 A1* | 8/2014 | Eastlake, III | H04L 41/12 370/254 |
| 2018/0109415 A1* | 4/2018 | Han | H04L 41/0661 |
| 2022/0060377 A1* | 2/2022 | Cagle | H04L 41/0879 |

* cited by examiner

*Primary Examiner* — William G Trost, IV
*Assistant Examiner* — Christopher P Cadorna
(74) *Attorney, Agent, or Firm* — Greenberg Traurig, LLP

(57) ABSTRACT

A disclosed computing device capable of intelligent power management of underutilized packet forwarding devices may include (1) a plurality of packet forwarding devices and (2) a controller communicatively coupled to the plurality of packet forwarding devices, wherein the controller is programmed to (A) search for configuration data associated with the plurality of packet forwarding devices, (B) determine, based at least in part on the search for the configuration data, that a packet forwarding device included in the plurality of packet forwarding devices is underutilized, and (C) reduce power consumption of the packet forwarding device in response to determining that the packet forwarding device is underutilized. Various other apparatuses, systems, and methods are also disclosed.

18 Claims, 6 Drawing Sheets

```
                               Configuration Data
                                      122

-----------------------------------------------------------------------
************************************************

DEVICE: Interface 212(1)
        CONFIGURATION: Data 402
        PFEs: Packet Forwarding Devices 102(1)-(N)
DEVICE: Interface 212(2)
        CONFIGURATION: Data 404
        PFEs: Packet Forwarding Devices 202(1)-(N)
DEVICE: Interface 212(3)
        CONFIGURATION: N/A
        PFEs: Packet Forwarding Devices 208(1)-(N)
PSEUDO-DEVICE: Pseudo-Interface 406
        CONFIGURATION: Data 408
        PFEs: Packet Forwarding Devices 102(1)-(N)
PSEUDO-DEVICE: Pseudo-Interface 410
        CONFIGURATION: N/A
        PFEs: Packet Forwarding Devices 202(1)-(N)
PSEUDO-DEVICE: Pseudo-Interface 412
        CONFIGURATION: N/A
        PFEs: Packet Forwarding Devices 208(1)-(N)

APPARATUS, SYSTEM, AND METHOD FOR INTELLIGENT POWER MANAGEMENT OF UNDERUTILIZED PACKET FORWARDING DEVICES

BACKGROUND

In the telecommunications context, line cards may represent field-replaceable switching components that provide transmitting and/or receiving ports. Such line cards may each include various packet forwarding devices that together consume a significant amount of power. Unfortunately, in certain configurations and/or scenarios, some of these packet forwarding devices may continue to consume a significant amount of power despite being underutilized. The instant disclosure, therefore, identifies and addresses a need for additional and/or improved apparatuses, systems, and methods for intelligent power management of underutilized packet forwarding devices.

SUMMARY

As will be described in greater detail below, the instant disclosure generally relates to apparatuses, systems, and methods for intelligent power management of underutilized packet forwarding devices. In one example, a computing device may include (1) a plurality of packet forwarding devices and (2) a controller communicatively coupled to the plurality of packet forwarding devices, wherein the controller is programmed to (A) search for configuration data associated with the plurality of packet forwarding devices, (B) determine, based at least in part on the search for the configuration data, that a packet forwarding device included in the plurality of packet forwarding devices is underutilized, and (C) reduce power consumption of the packet forwarding device in response to determining that the packet forwarding device is underutilized.

Similarly, a system for intelligent power management of underutilized packet forwarding devices may include (1) a plurality of packet forwarding devices, (2) a port concentrator communicatively coupled to the plurality of packet forwarding devices, and (3) a controller communicatively coupled to the plurality of packet forwarding devices, wherein the controller is programmed to (A) search for configuration data associated with the plurality of packet forwarding devices, (B) determine, based at least in part on the search for the configuration data, that a packet forwarding device included in the plurality of packet forwarding devices is underutilized, and (C) reduce power consumption of the packet forwarding device in response to determining that the packet forwarding device is underutilized.

A corresponding method may include (1) searching for configuration data associated with a plurality of packet forwarding devices, (2) determining, based at least in part on the search for the configuration data, that a packet forwarding device included in the plurality of packet forwarding devices is underutilized, and (3) reducing power consumption of the packet forwarding device in response to determining that the packet forwarding device is underutilized.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of exemplary configuration data capable of being used by a computing device to determine whether to reduce the power consumption of one or more packet forwarding devices in accordance with one or more embodiments of this disclosure.

Figure 1:
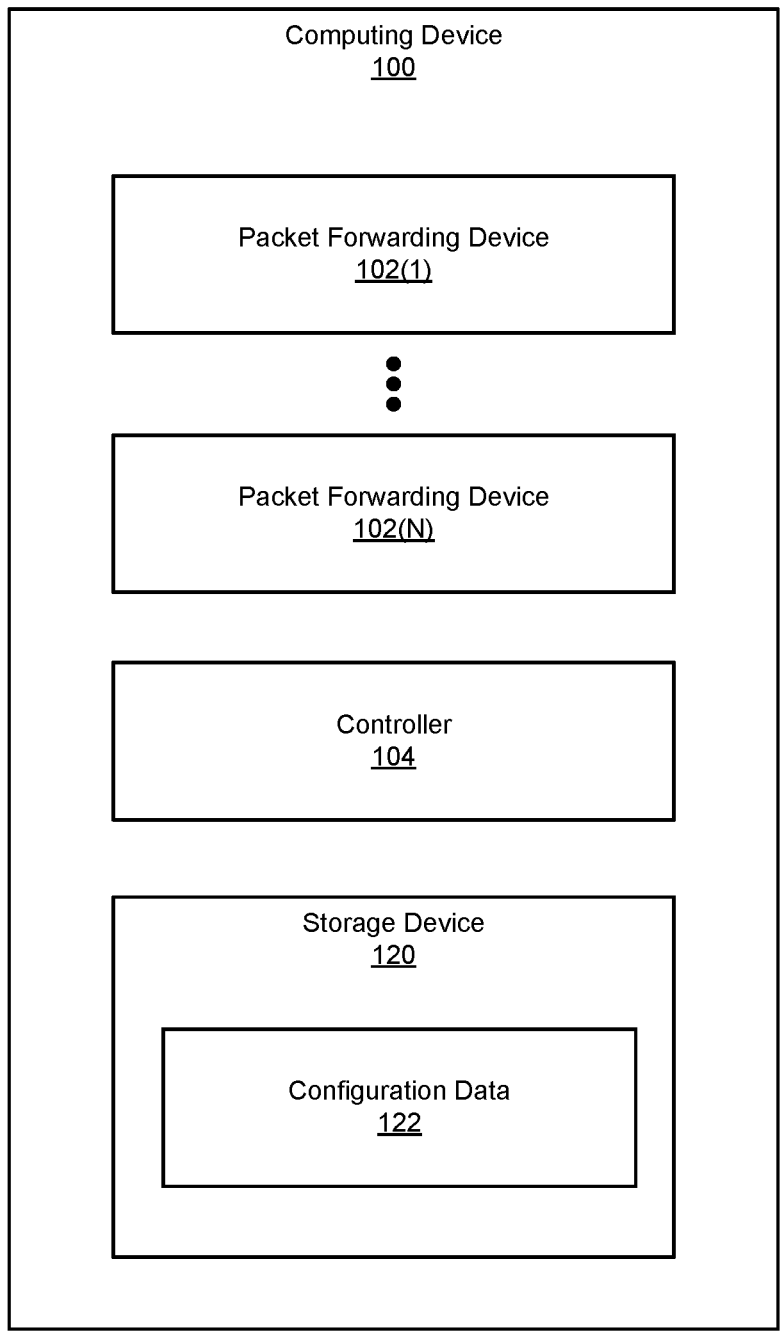
FIG. 1 is an illustration of an exemplary computing device that facilitates intelligent power management of underutilized packet forwarding devices in accordance with one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for intelligent power management of underutilized packet forwarding devices. As will be described in greater detail below, embodiments of the present disclosure may include and/or involve analyzing and/or evaluating configuration data associated with packet forwarding devices. For example, a line card may include and/or represent various packet forwarding devices and/or a controller that searches for configuration data associated with the packet forwarding devices. In this example, the controller may determine that no interfaces of a certain type (e.g., physical interface cards, flexible physical interface card concentrators, ports, optical modules, modular port concentrators, etc.) are configured for operation in connection with one of the packet forwarding devices.

In response to this determination, the controller may reduce and/or decrease the power consumption of the line card via that packet forwarding device. For example, the controller may refrain from powering on the packet forwarding device during bootup, power off the packet forwarding device during runtime, and/or shut down one or more features (e.g., packet processing engines and/or processor cores) of the packet forwarding device. Accordingly, the controller may implement a static power management scheme that intelligently reduces the power consumption of the packet forwarding devices at bootup and then maintains the same power configuration of the packet forwarding devices throughout runtime. Additionally or alternatively, the controller may implement a dynamic power management scheme that intelligently reduces the power consumption of the packet forwarding devices at bootup and/or throughout runtime.

Either way, the controller may attempt to optimize and/or minimize the number and/or amount of packet forwarding devices needed to accommodate the traffic for a certain Internet provider's customer base. By so optimizing and/or minimizing the number and/or amount of packet forwarding devices in this way, the controller may effectively optimize and/or minimize the amount of power needed to support and/or operate a corresponding telecommunications system.

Figure 2:
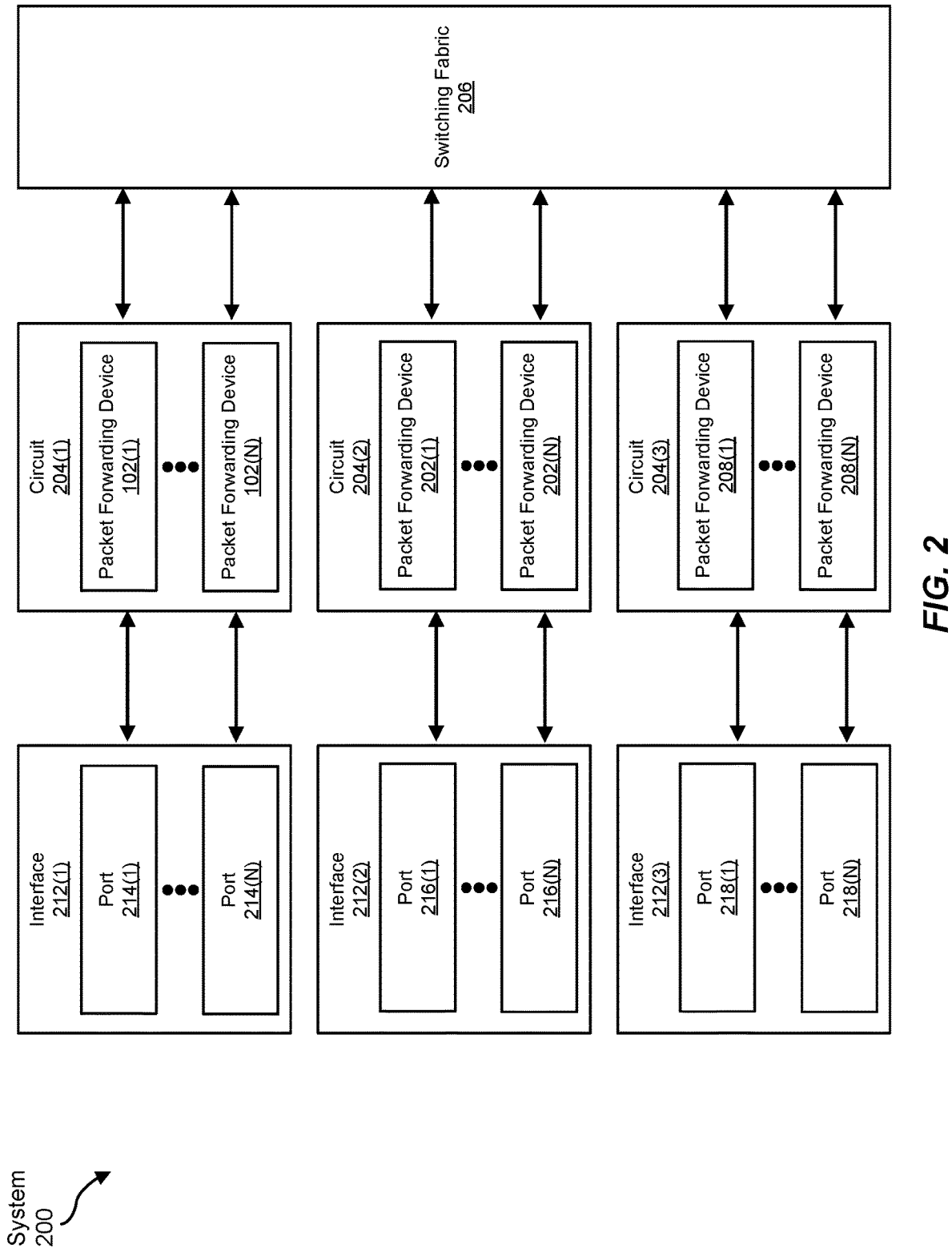
FIG. 2 is an illustration of an exemplary computing device that facilitates intelligent power management of underutilized packet forwarding devices in accordance with one or more embodiments of this disclosure.
Figure 3:
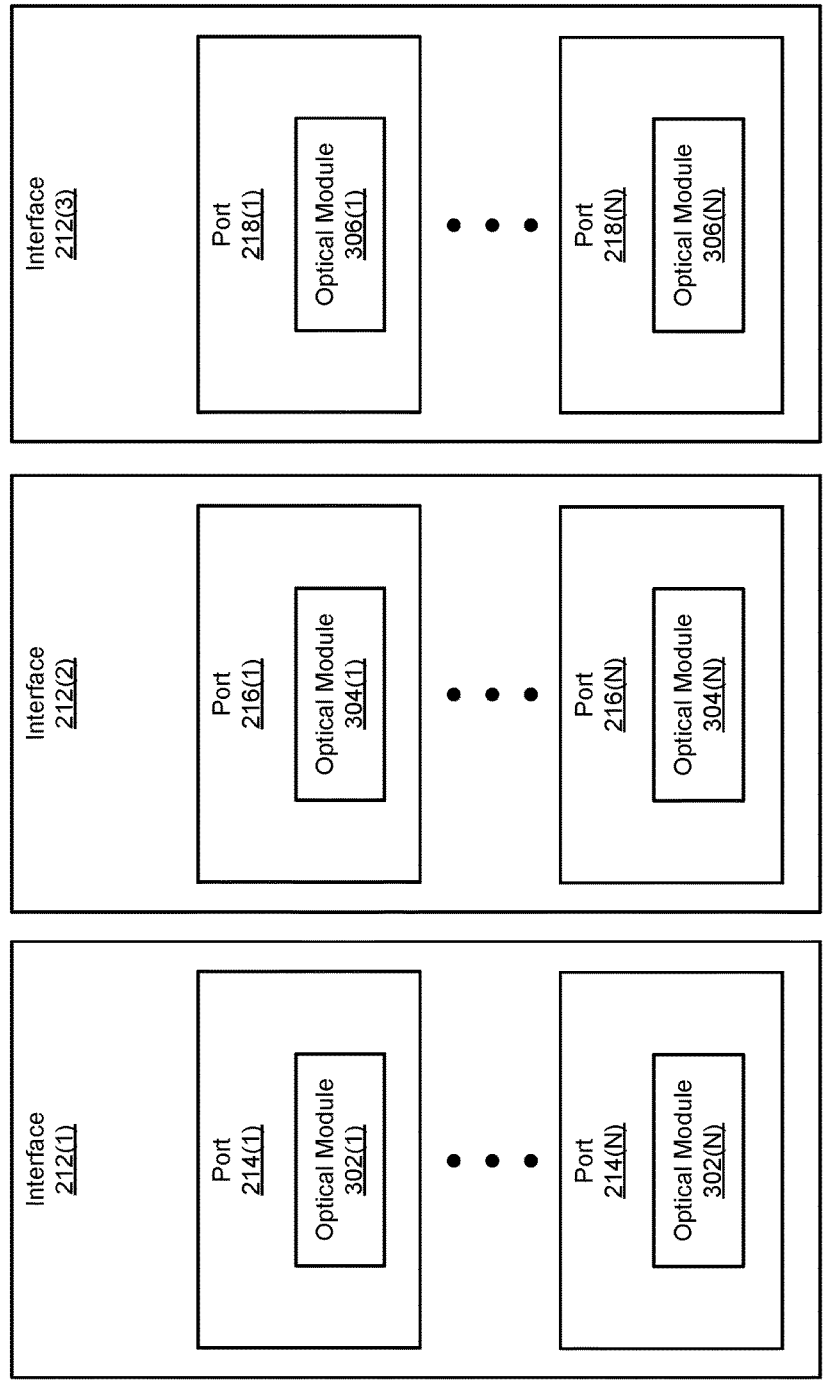
FIG. 3 is an illustration of an exemplary computing device that facilitates intelligent power management of underutilized packet forwarding devices in accordance with one or more embodiments of this disclosure.

The following will provide, with reference to FIGS. 1-3, detailed descriptions of exemplary apparatuses, devices, systems, and corresponding implementations for intelligent power management of underutilized packet forwarding devices. Detailed descriptions of an exemplary method for intelligent power management of underutilized packet forwarding devices will be provided in connection with FIG. 5. In addition, detailed descriptions of an exemplary computing system for carrying out such a method will be provided in connection with FIG. 6.

FIG. 1 illustrates at least a portion of an exemplary computing device 100 capable of intelligent power management of underutilized packet forwarding devices. As illustrated in FIG. 1, exemplary computing device 100 may include and/or represent packet forwarding devices 102(1)-(N), a controller 104, and/or a storage device 120. In some examples, storage device 120 may store and/or maintain configuration data 122 associated with and/or corresponding to packet forwarding devices 102(1)-(N). In one example, controller 104 may search for configuration data 122 at bootup and/or during runtime. In this example, controller 104 may access, read, and/or evaluate configuration data 122.

In some examples, controller 104 may determine that one or more of packet forwarding devices 102(1)-(N) is underutilized based at least in part on the search and/or configuration data 122. In such examples, controller 104 may make this determination during bootup and/or runtime. In one example, an underutilized packet forwarding device may be unused and/or completely idle. In this example, the underutilized packet forwarding device may be handling no traffic at all. Additionally or alternatively, an underutilized packet forwarding device may be configured and/or programmed to handle no traffic at all. Or put differently, the underutilized packet forwarding device may lack a configuration and/or programming that facilitates handling traffic.

In some examples, controller 104 may search for configuration data 122 associated with and/or corresponding to packet forwarding devices 102(1)-(N). In one example, during the search, controller 104 may fail to identify and/or be unable to find any configuration for one or more of packet forwarding device 102(1)-(N). In this example, controller 104 may then determine that such packet forwarding devices are underutilized due at least in part to the failure to identify and/or inability to find the corresponding configuration(s). In another example, during the search, controller 104 may identify and/or find one or more files that include and/or represent configuration data for packet forwarding devices 102(1)-(N). In this example, controller 104 may determine that one or more of packet forwarding devices 102(1)-(N) are underutilized due at least in part on the corresponding configuration(s) missing and/or being absent from configuration data 122.

In some examples, controller 104 may reduce and/or decrease the power consumption of any or all underutilized packet forwarding devices in response to determining that those packet forwarding devices are underutilized. In such examples, controller 104 may perform this reduction and/or decrease of power consumption during bootup and/or runtime. In one example, controller 104 may refrain and/or abstain from powering on the underutilized packet forwarding device(s) during bootup. In this example, controller 104 may power off or down the underutilized packet forwarding device(s) during runtime and/or during bootup. In this example, controller 104 may shut off or down one or more features (e.g., packet processing engines and/or processor cores) of the packet forwarding device(s). In certain implementations, controller 104 may control and/or regulate the power to the packet forwarding device(s) via a programmable switch and/or regulator.

In some examples, configuration data 122 may indicate, suggest, and/or show that no interfaces are configured for operation in connection with one or more of packet forwarding devices 102(1)-(N). In one example, controller 104 may determine that the packet forwarding device(s) are underutilized due at least in part to configuration data 122 indicating that no interfaces are configured for operation in connection with the packet forwarding device(s). Examples of such interfaces include, without limitation, physical interface cards, flexible physical interface card concentrators, ports (e.g., Ethernet ports), optical modules, modular port concentrators, field-replaceable units, combinations or variations of one or more of the same, and/or any other suitable interfaces.

In some examples, controller 104 may determine that one or more of packet forwarding devices 102(1)-(N) are sufficiently utilized. In one example, controller 104 may maintain power to the sufficiently utilized packet forwarding device(s) in response to determining that the packet forwarding device(s) are sufficiently utilized. In one example, a sufficiently utilized packet forwarding device may be fully or partially used and/or non-idle. In this example, the sufficiently utilized packet forwarding device may be handling at least some amount of traffic. Additionally or alternatively, a sufficiently utilized packet forwarding device may be configured and/or programmed to handle at least some traffic. Or put differently, the sufficiently utilized packet forwarding device may have a configuration and/or programming that facilitates handling traffic.

In some examples, controller 104 may determine that one or more of packet forwarding devices 102(1)-(N) are sufficiently utilized during a bootup process. In one example, controller 104 may power on and/or up the packet forwarding device(s) in response to determining that the packet forwarding device(s) are sufficiently utilized.

In some examples, controller 104 may determine that no optical modules are installed in a certain interface communicatively coupled to one or more of packet forwarding devices 102(1)-(N). In one example, controller 104 may reduce and/or decrease the number of packet processing devices (e.g., packet processing engines) that are operational on such packet forwarding devices in response to determining that no optical modules are installed in that interface. Additionally or alternatively, controller 104 may refrain from operating any interfaces in connection with such packet forwarding devices in response to determining that no optical modules are installed in that interface.

In some examples, configuration data 122 may indicate, suggest, and/or show that no interfaces are configured for operation in connection with any of packet forwarding devices 102(1)-(N). In one example, controller 104 may determine that packet forwarding devices 102(1)-(N) are all underutilized due at least in part to configuration data 122 indicating that no interfaces are configured for operation in connection with any of packet forwarding devices 102(1)-(N). In this example, controller 104 may also reduce and/or decrease power consumption of packet forwarding devices 102(1)-(N) in response to that determination. In certain implementations, computing device 100 may include and/or represent various interfaces that are communicatively coupled to packet forwarding devices 102(1)-(N). In such implementations, controller 104 may refrain from powering on any of those interfaces in response to determining that packet forwarding devices 102(1)-(N) are all underutilized.

In some examples, an interface communicatively coupled to one or more of packet forwarding devices 102(1)-(N) may be powered off and/or shut down. In this example, controller 104 may determine that one or more ports included on that interface has been dynamically configured for operation in connection with the packet forwarding device(s). Controller 104 may then power on and/or up that interface due at least in part to the port(s) included on that interface having been dynamically configured for operation in connection with the packet forwarding device(s). In certain implementations, controller 104 may power on and/or up each of packet forwarding devices 102(1)-(N) for which that interface has been dynamically configured.

In some examples, controller 104 may determine that a configuration of an interface communicatively coupled to one of packet forwarding devices 102(1)-(N) has been deleted. In one example, controller 104 may reboot, shut down, and/or bring down that interface and then power off and/or shut down that packet forwarding device as that interface reboots, shuts down, and/or is brought down due at least in part to the configuration of that interface have been deleted. For example, controller 104 may power off and/or shut down that packet forwarding device because that packet forwarding device is no longer communicatively coupled to any interfaces with existing configurations.

In some examples, controller 104 may determine that a configuration of each port included on that interface has been deleted. In this example, controller 104 may power off and/or shut down one of packet forwarding devices 102(1)-(N) due at least in part on the configuration of each port included on the interface having been deleted. For example, controller 104 may dynamically power off and/or shut down that packet forwarding device during runtime via a reset feature because none of the interfaces to which that packet forwarding device is communicatively coupled have ports with existing and/or active configurations. Additionally or alternatively, controller 104 may power off and/or shut down the interface in response to the configuration of each port included on the interface having been deleted.

In some examples, packet forwarding devices 102(1)-(N) may each include and/or represent one or more hardware-implemented devices and/or circuits capable of handling, processing, and/or preparing traffic for transmission and/or forwarding. In one example, packet forwarding devices 102(1)-(N) may each include and/or represent a packet forwarding engine (PFE) composed of multiple packet processing engines. In this example, each of packet forwarding devices 102(1)-(N) and/or their corresponding packet processing engines may parse packets, perform lookup operations, perform filtering operations, classify packets, and/or encapsulate packets. In certain implementations, packet forwarding devices 102(1)-(N) and/or their corresponding packet processing engines may process packets and/or forward packets between input and output interfaces.

In some examples, controller 104 may include and/or represent one or more hardware-implemented processors and/or compute modules capable of interpreting and/or executing computer-readable instructions. Additionally or alternatively, controller 104 may include and/or represent any type or form of circuitry that processes, converts, and/or transforms input, data, or signals in one way or another. In one example, controller 104 may include and/or represent multiple circuits distributed across computing device 100 and/or throughout a larger computing system. Examples of controller 104 include, without limitation, physical processors, central processing units (CPUs), microprocessors, microcontrollers, field-programmable gate arrays (FPGAs), application-specific integrated circuits (ASICs), systems on chips (SoCs), parallel accelerated processors, tensor cores, integrated circuits, chiplets, portions of one or more of the same, combinations or variations of one or more of the same, and/or any other suitable controller.

In some examples, controller 104 may represent part of and/or be incorporated into various devices and/or locations of a larger computing system. For example, controller 104 may represent part of and/or be incorporated into computing device 100 that includes packet forwarding devices 102(1)-(N). In this example, controller 104 may also perform various tasks described herein on behalf of and/or in connection with computing device 100. In another example, although not necessarily illustrated in this way in FIG. 1, controller 104 may represent part of and/or be incorporated into one of packet forwarding devices 102(1)-(N). In a further example, controller 104 may constitute and/or represent standalone circuitry and/or a separate device that is district from but associated with one or more of packet forwarding devices 102(1)-(N) and/or computing device 100.

In some examples, storage device 120 may include and/or represent any type or form of volatile or non-volatile memory device or medium capable of storing data and/or computer-readable instructions. In one example, storage device 120 may store, load, and/or maintain certain modules and/or computer-readable instructions executed by controller 104. Examples of storage device 120 include, without limitation, random access memory (RAM), read only memory (ROM), flash memory, hard disk drives (HDDs), solid-state drives (SSDs), optical disks, caches, variations or combinations of one or more of the same, and/or any other suitable storage devices.

In some examples, configuration data 122 may include and/or represent any type or form of information and/or data indicative of or corresponding to certain interfaces and/or components of computing device 100. In one example, configuration data 122 may include and/or represent information and/or data about interfaces and/or components configured for operation in connection with one or more of packet forwarding devices 102(1)-(N). In other words, configuration data 122 may include and/or represent any configurations, if they exist, of interfaces (whether virtual or physical) that are communicatively coupled to packet forwarding devices 102(1)-(N). For example, configuration data 122 may include and/or represent one or more indications of whether certain wide area network (WAN) interfaces and/or pseudo-interfaces are configured and/or programmed for operation with one or more of packet forwarding devices 102(1)-(N). Additionally or alternatively, configuration data 122 may lack information and/or data indicative of whether certain WAN interfaces and/or pseudo-interfaces (e.g., real and/or virtual interfaces) are configured and/or programmed for operation with one or more of packet forwarding devices 102(1)-(N). In other words, information and/or data specific to certain wide area network (WAN) interfaces and/or pseudo-interfaces may be missing and/or absent from configuration data 122.

In some examples, computing device 100 may constitute and/or represent any type or form of physical computing device capable of reading computer-executable instructions, performing computations, transforming data, and/or handling network traffic. Examples of computing device 100 include, without limitation, network devices, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, client devices, laptops, tablets, desktops, servers, cellular phones, personal digital assistants (PDAs), multimedia players, embedded systems, wearable devices, gaming consoles, variations or combinations of one or more of the same, and/or any other suitable computing devices.

FIG. 2 illustrates at least a portion of an exemplary system 200 that includes and/or represents multiple circuits, multiple interfaces, and a switching fabric. In some examples, system 200 in FIG. 2 may include and/or represent certain devices, components, configurations, and/or features that perform and/or provide functionalities that are similar and/or identical to those described above in connection with FIG. 1. In one example, system 200 may include and/or represent interfaces 212(1), 212(2), and 212(3). In this example, system 200 may also include and/or represent circuits 204(1), 204(2), and 204(3). Additionally or alternatively, system 200 may include and/or represent a switching fabric 206.

Although not necessarily illustrated in this way in FIG. 2, system 200 may also include and/or represent one or more additional circuits, components, and/or features that are not necessarily illustrated and/or labeled in FIG. 2. For example, system 200 may additionally include and/or represent controller 104, storage device 120, and/or configuration data 122. In some examples, circuits 204(1)-(3) may be communicatively coupled to interfaces 212(1)-(3), respectively. Additionally, or alternatively, circuits 204(1)-(3) may each be communicatively coupled to switching fabric 206. In one example, interfaces 212(1)-(3) may include and/or represent ports 214(1)-(N), 216(1)-(N), and 218(1)-(N), respectively. In this example, circuits 204(1)-(3) may include and/or represent packet forwarding devices 102(1)-(N), 202(1)-(N), 208(1)-(N), respectively.

In one example, each of interfaces 212(1)-(3) may include and/or represent a physical interface card. Additionally or alternatively, each of circuits 204(1)-(3) may include and/or represent an ASIC and/or modular power concentrator on which multiple packet forwarding devices are disposed.

In some examples, system 200 may implement and/or apply a static power on/off scheme. As part of an exemplary static power on/off scheme, controller 104 may perform different functions and/or actions during boot time and/or during runtime. For example, during boot time of the static power on/off scheme, controller 104 may parse and/or examine configuration data 122 for any WAN interface configurations and/or pseudo-interface configurations in connection with packet forwarding devices 102(1)-(N), 202(1)-(N), or 208(1)-(N). In one example, controller 104 may finalize which of packet forwarding devices 102(1)-(N), 202(1)-(N), or 208(1)-(N) to power on and/or power off based at least in part on that the WAN interface and/or pseudo-interface configurations included in configuration data 122. In this example, controller 104 may power off and/or refrain from powering on any or all of circuits 204(1)-(3) on which there are no active and/or operational packet forwarding devices. In certain implementations, controller 104 may direct and/or cause system 200 to notify a user of those circuits that are down, nonfunctional, or nonoperational and/or have been powered on or off via a message and/or chassis alarm presented by a command line interface.

During runtime of the static power on/off scheme, controller 104 may identify and/or determine all of interfaces 212(1)-(3) that are down, nonfunctional, and/or nonoperational. In some examples, if all of interfaces 212(1)-(3) are down, a corresponding modular port concentrator(s) may remain up and/or operational, and controller 104 may clock-gate the lockup sub-system (LUSS) packet processing engines (PPEs) included on a corresponding PFE. For example, controller 104 may reduce and/or decrease the amount of LUSS PPEs operating on the PFE by approximately 95% or so. In this example, the clock-gated LUSS PPEs may remain dormant and/or paused for a certain period of time.

Also during runtime of the static power on/off scheme, controller 104 may add an interface configuration on and/or to a powered-off PFE. If a corresponding modular port concentrator is in a powered-on state, this modular port concentrator may continue running and/or operating despite the addition of the interface configuration. In this example, the interface configuration may fail to take effect due at least in part to the static power on/off scheme. If this modular port concentrator is in a powered-off state, this modular port concentrator may be rebooted automatically in response to the addition of the interface configuration. During this reboot, each PFE with a corresponding interface configuration may be powered on due at least in part to the corresponding interface configuration. Conversely, each PFE without any corresponding interface configuration may be powered off and/or remain powered-off due at least in part to the lack of any corresponding interface configuration.

Further during runtime of the static power on/off scheme, controller 104 may delete and/or remove an interface configuration from a powered-on PFE. If the interface configuration is deleted on all of packet forwarding devices 102(1)-(N), 202(1)-(N), or 208(1)-(N), a corresponding modular port concentrator may be powered off automatically. If one or more PFEs still have interface configurations, the corresponding modular port concentrator(s) may remain up and/or operational, and controller 104 may clock-gate the LUSS PPEs included on a corresponding PFE. For example, controller 104 may reduce and/or decrease the amount of LUSS PPEs operating on the PFE by approximately 95% or so.

In some examples, system 200 may implement and/or apply a dynamic power on/off scheme. As part of an exemplary dynamic power on/off scheme, controller 104 may perform different functions and/or actions during boot time and/or during runtime. For example, during boot time of the dynamic power on/off scheme, controller 104 may parse and/or examine configuration data 122 for any WAN interface configurations and/or pseudo-interface configurations in connection with packet forwarding devices 102(1)-(N), 202(1)-(N), or 208(1)-(N). In one example, controller 104 may finalize which of packet forwarding devices 102(1)-(N), 202(1)-(N), or 208(1)-(N) to power on and/or power off based at least in part on that the WAN interface and/or pseudo-interface configurations included in configuration data 122. In this example, controller 104 may power off and/or refrain from powering on any or all of circuits 204(1)-(3) on which there are no active and/or operational packet forwarding devices. In certain implementations, controller 104 may direct and/or cause system 200 to notify a user of those circuits that are down, nonfunctional, or nonoperational and/or have been powered on or off via a message and/or chassis alarm presented by a command line interface.

During runtime of the dynamic power on/off scheme, controller 104 may identify and/or determine all of interfaces 212(1)-(3) that are down, nonfunctional, and/or nonoperational. In some examples, if all of interfaces 212(1)-(3) are down, a corresponding modular port concentrator(s) may remain up and/or operational, and controller 104 may clock-gate the lockup sub-system LUSS PFEs included on a corresponding PFE. For example, controller 104 may reduce and/or decrease the amount of LUSS PPEs operating on the PFE by approximately 95% or so.

Also during runtime of the dynamic power on/off scheme, controller 104 may add an interface configuration on and/or to a powered-off PFE. If a corresponding modular port concentrator is in a powered-on state, the affected PFEs may be powered on dynamically and/or fabric links may be trained in response to the addition of the interface configuration. Additionally or alternatively, if the corresponding modular port concentrator is in a powered-on state, physical interface cards may be discovered and/or interface configurations may be played back. If the corresponding modular port concentrator is in a powered-off state, this modular port concentrator may be rebooted automatically in response to the addition of the interface configuration. During this reboot, each PFE with a corresponding interface configuration may be powered on due at least in part to the corresponding interface configuration. Conversely, each PFE without any corresponding interface configuration may be powered off and/or remain powered-off due at least in part to the lack of any corresponding interface configuration.

Further during runtime of the dynamic power on/off scheme, controller 104 may delete and/or remove an interface configuration from a powered-on PFE. If the interface configuration is deleted on all of packet forwarding devices 102(1)-(N), 202(1)-(N), or 208(1)-(N), the corresponding modular port concentrator may be powered off automatically. If one or more PFEs still have interface configurations, the affected PFEs may be powered off dynamically due at least in part to the interface configurations. Additionally or alternatively, if those PFEs still have interface configurations, the fabric and/or WAN links may be powered off due at least in part to the interface configurations.

In some examples, controller 104 may provide, facilitate, and/or support on-demand powering on/off PFEs via a command line interface. For example, such an on-demand power on/off scheme may provide, facilitate, and/or support requests for powering on certain PFEs (e.g., request chassis fpc slot < > pfe-instance < > online). Additionally or alternatively, such an on-demand power on/off scheme may provide, facilitate, and/or support requests for powering off certain PFEs (e.g., request chassis fpc slot < > pfe-instance < > offline).

In some examples, controller 104 may provide, facilitate, and/or support configurable resiliency actions for PFEs. For example, controller 104 may provide an infrastructure for taking PFEs offline and/or restarting PFEs.

FIG. 3 illustrates at least a portion of an exemplary device 300 that includes and/or represents multiple interfaces that each incorporate and/or form ports dimensioned for the installation of optical modules. In some examples, device 300 in FIG. 3 may include and/or represent certain devices, components, configurations, and/or features that perform and/or provide functionalities that are similar and/or identical to those described above in connection with FIG. 1 and/or FIG. 2. In one example, computing device 300 may include and/or represent interfaces 212(1)-(3), which incorporate ports 214(1)-(N), 216(1)-(N), and/or 218(1)-(N), respectively. In this example, these ports may each be configured and/or dimensioned to house, accept, and/or receive an optical module that provides, facilitates, and/or supports traffic traversing a network.

As a specific example, an optical module 302(1) may be installed into port 214(1), and an optical module 302(N) may be installed into port 214(N). In one example, an optical module 304(1) may be installed into port 216(1), and an optical module 304(N) may be installed into port 216(N). In this example, an optical module 306(1) may be installed into port 218(1), and an optical module 306(N) may be installed into port 216(N). In some examples, any of these optical modules may be installed and/or removed to achieve a certain configuration in connection with interfaces 212(1)-(3).

FIG. 4 illustrates an exemplary implementation of configuration data 122 associated with packet forwarding devices 102(1)-(N), 202(1)-(N), and 208(1)-(N). In some examples, configuration data 122 in FIG. 4 may reference and/or be associated with any of the devices, components, configurations, and/or features described above in connection with FIGS. 1-4. As illustrated in FIG. 4, configuration data 122 may include and/or represent the configurations of various devices (whether real or virtual) operating on a telecommunications system.

In some examples, configuration data 122 may identify interfaces 212(1)-(3) as real and/or WAN devices installed and/or incorporated in the telecommunications system. Additionally or alternatively, configuration data 122 may identify pseudo-interfaces 406, 410, and 412 as virtual devices and/or pseudo-devices running and/or operating on the telecommunications system. In one example, configuration data 122 may indicate that data 402 is a configuration for interface 212(1) and/or that packet forwarding devices 102(1)-(N) correspond to or direct traffic for interface 212(1). In this example, configuration data 122 may indicate that data 404 is a configuration for interface 212(2) and/or that packet forwarding devices 202(1)-(N) correspond to or direct traffic for interface 212(2). Additionally or alternatively, configuration data 122 may indicate that no configuration is applied to interface 212(1) and/or that packet forwarding devices 208(1)-(N) correspond to or direct traffic for interface 212(3).

In one example, configuration data 122 may indicate that data 408 is a configuration for pseudo-interface 406 and/or that packet forwarding devices 102(1)-(N) correspond to or direct traffic for pseudo-interface 406. In this example, configuration data 122 may indicate that no configuration is applied to pseudo-interface 410 and/or that packet forwarding devices 202(1)-(N) correspond to or direct traffic for pseudo-interface 410. Additionally or alternatively, configuration data 122 may indicate that no configuration is applied to pseudo-interface 412 and/or that packet forwarding devices 208(1)-(N) correspond to or direct traffic for pseudo-interface 412.

In some examples, the various devices and systems described in connection with FIGS. 1-3 may include and/or represent one or more additional circuits, components, and/ or features that are not necessarily illustrated and/or labeled in FIGS. 1-3. For example, the devices illustrated in FIGS. 1-3 may also include and/or represent additional analog and/or digital circuitry, onboard logic, transistors, transmitters, receivers, transceivers, antennas, resistors, capacitors, diodes, inductors, switches, registers, flipflops, connections, traces, buses, semiconductor (e.g., silicon) devices and/or structures, processing devices, storage devices, circuit boards, sensors, packages, substrates, housings, combinations or variations of one or more of the same, and/or any other suitable components that facilitate and/or support intelligent power management of underutilized packet forwarding devices. In certain implementations, one or more of these additional circuits, components, and/or features may be inserted and/or applied between any of the existing circuits, components, and/or features illustrated in FIGS. 1-3 consistent with the aims and/or objectives described herein. Accordingly, the couplings and/or connections described with reference to FIGS. 1-3 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide continuity from one of those two components to the other. In other words, the indirect coupling may include and/or incorporate at least one additional component between those two components.

Figure 5:
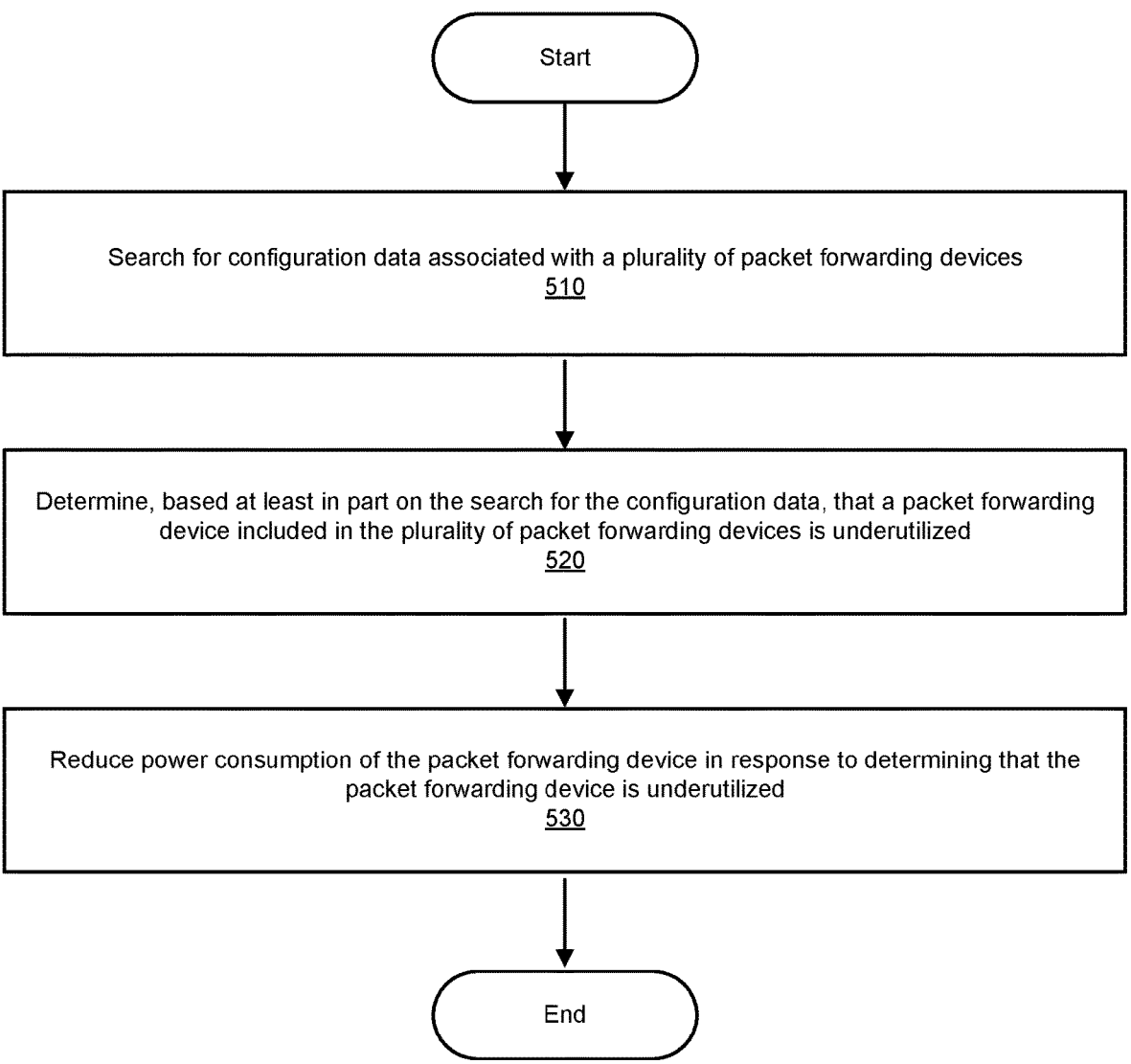
FIG. 5 is a flow diagram of an exemplary method for intelligent power management of underutilized packet forwarding devices in accordance with one or more embodiments of this disclosure.

FIG. 5 is a flow diagram of an exemplary method 500 for intelligent power management of underutilized packet forwarding devices. In one example, the steps shown in FIG. 5 may be achieved and/or accomplished by a system, computing device, and/or server for facilitating and/or supporting intelligent power management of underutilized packet forwarding devices. Additionally or alternatively, the steps shown in FIG. 5 may incorporate and/or involve certain sub-steps and/or variations consistent with the descriptions provided above in connection with FIGS. 1-4.

As illustrated in FIG. 5, method 500 may include the step of searching for configuration data associated with a plurality of packet forwarding devices (510). Step 510 may be performed in a variety of ways, including any of those described above in connection with FIGS. 1-4. For example, a controller may search for configuration data associated with a plurality of packet forwarding devices.

Method 500 may also include the step of determining, based at least in part on the search for the configuration data, that a packet forwarding device included in the plurality of packet forwarding devices is underutilized (520). Step 520 may be performed in a variety of ways, including any of those described above in connection with FIGS. 1-4. For example, the controller may determine, based at least in part on the search for the configuration data, that a packet forwarding device included in the plurality of packet forwarding devices is underutilized.

Method 500 may further include the step of reducing power consumption of the packet forwarding device in response to determining that the packet forwarding device is underutilized (530). Step 530 may be performed in a variety of ways, including any of those described above in connection with FIGS. 1-4. For example, the controller may reduce power consumption of the packet forwarding device in response to determining that the packet forwarding device is underutilized.

Figure 6:
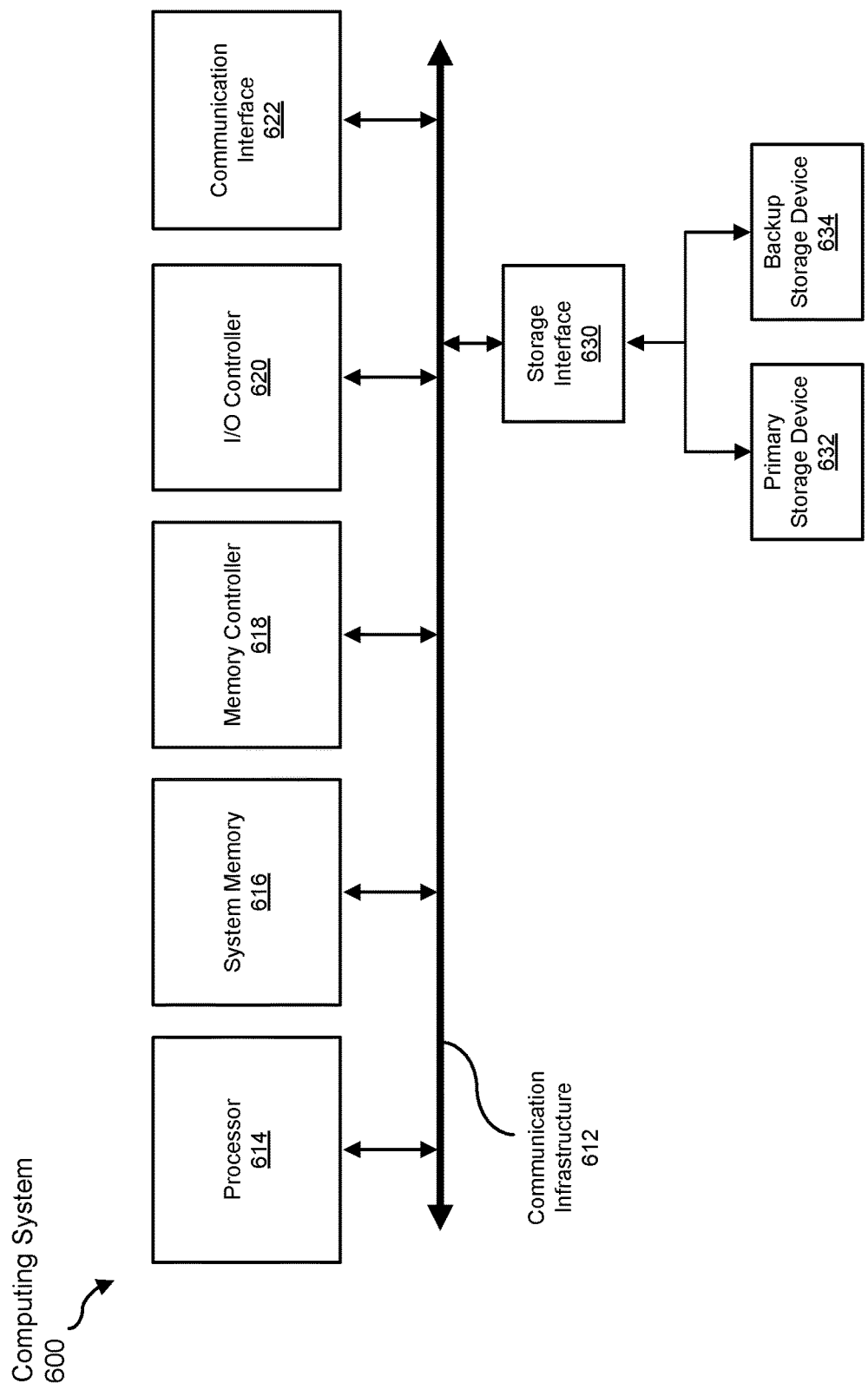
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 6. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and 1/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of computing device 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules described herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device comprising:
a plurality of packet forwarding devices;
a storage device that stores configuration data associated with the plurality of packet forwarding devices;
an interface communicatively coupled to a packet forwarding device included in the plurality of packet forwarding devices; and
a controller communicatively coupled to the plurality of packet forwarding devices, wherein the controller is programmed to:
search the configuration data for an indication of whether an interface communicatively coupled to the packet forwarding device lacks a configuration to handle traffic;
determine, based at least in part on the configuration data, that an additional packet forwarding device included in the plurality of packet forwarding device is configured to handle traffic;
determine, based at least in part on the indication, that the interface lacks the configuration;
determine that the packet forwarding device is idle due at least in part to the interface lacking the configuration;
reduce power consumption of the packet forwarding device by ensuring that the packet forwarding device is powered off in response to determining that the packet forwarding device is idle;
determine that at least one port included on the interface has been dynamically configured for operation in connection with the packet forwarding device during runtime; and
power on the packet forwarding device as the interface reboots due at least in part to the interface having been dynamically configured for operation in connection with the packet forwarding device.

2. The computing device of claim 1, wherein the controller is further programmed to reduce the power consumption of the packet forwarding device by at least one of:
powering off the packet forwarding device;
refraining from powering on the packet forwarding device; or
shutting down one or more features of the packet forwarding device.

3. The computing device of claim 1, wherein the controller is further programmed to:
determine that the additional packet forwarding device included in the plurality of packet forwarding devices is sufficiently utilized due at least in part to the additional packet forwarding device being configured to handle traffic; and
maintain power to the additional packet forwarding device in response to determining that the additional packet forwarding device is sufficiently utilized.

4. The computing device of claim 1, wherein the controller is further programmed to:
determine, during a bootup process, that the packet forwarding device lacks the configuration; and refrain from powering on the packet forwarding device in response to determining that the packet forwarding device lacks the configuration.

5. The computing device of claim 1, wherein the controller is further programmed to:
  determine, during a bootup process, that the additional packet forwarding device is sufficiently utilized due at least in part to the additional packet forwarding device being configured to handle traffic; or
  power on the additional packet forwarding device in response to determining that the additional packet forwarding device is sufficiently utilized.

6. The computing device of claim 1, wherein the indication comprises at least one of:
  an indication of whether any wide area network (WAN) interfaces are configured for operation in connection with the packet forwarding device; or
  an indication of whether any real or virtual interfaces are configured for operation in connection with the packet forwarding device.

7. The computing device of claim 1, wherein the controller is further programmed to:
  determine that no optical modules are installed in the interface; and
  reduce a number of packet processing devices that are operational on the packet forwarding device in response to determining that no optical modules are installed in the interface.

8. The computing device of claim 7, wherein the controller is further programmed to refrain from operating the interface in connection with the packet forwarding device in response to determining that no optical modules are installed in the interface.

9. The computing device of claim 1, wherein:
  the configuration data indicates that no interfaces of a certain type are configured for operation in connection with any of the plurality of the packet forwarding devices; and
  the controller is further programmed to:
    determine that the plurality of packet forwarding devices are all idle due at least in part to the configuration data indicating that no interfaces of the certain type are configured for operation in connection with any of the plurality of the packet forwarding devices; and
    reduce power consumption of the plurality of packet forwarding devices in response to determining that the plurality of packet forwarding devices are all idle.

10. The computing device of claim 9, further comprising a plurality of interfaces communicatively coupled to the plurality of packet forwarding devices, wherein the controller is further programmed to refrain from powering on the plurality of interfaces in response to determining that the plurality of packet forwarding devices are all idle.

11. The computing device of claim 1, wherein:
  the interface is powered off; and
  the controller is further programmed to:
    determine that at least one port included on the interface has been dynamically configured for operation in connection with at least one of the plurality of packet forwarding devices during runtime; and
    power on the interface due at least in part to the port having been dynamically configured for operation in connection with the at least one of the plurality of packet forwarding devices.

12. The computing device of claim 11, wherein the controller is further configured to power on each of the plurality of packet forwarding devices for which the interface has been dynamically configured.

13. The computing device of claim 1, wherein:
  the controller is further programmed to:
    determine that the configuration has been deleted from the configuration data;
    reboot the interface; and
    power off the packet forwarding device as the interface reboots due at least in part to the configuration having been deleted.

14. The computing device of claim 1, wherein:
  the interface is communicatively coupled to a further packet forwarding device included in the plurality of packet forwarding devices; and
  the controller is further programmed to:
    determine that configurations for all ports included on the interface have been deleted from the configuration data; and
    dynamically power off the further packet forwarding device during runtime via a reset feature due at least in part to the configurations for all the ports included on the interface having been deleted.

15. The computing device of claim 1, wherein:
  the controller is further programmed to:
    determine that configurations for all ports included on the interface have been deleted from the configuration data; and
    power off the interface in response to the configurations having been deleted.

16. A system comprising:
  a plurality of packet forwarding devices;
  an interface communicatively coupled to the plurality of packet forwarding devices; and
  a controller communicatively coupled to the plurality of packet forwarding devices, wherein the controller is programmed to:
    search configuration data that is associated with the plurality of packet forwarding devices and stored in a storage device for an indication of whether the interface lacks a configuration to handle traffic;
    determine, based at least in part on the configuration data, that an additional packet forwarding device included in the plurality of packet forwarding device is configured to handle traffic;
    determine, based at least in part on the indication, that the interface lacks the configuration;
    determine that the packet forwarding device is idle due at least in part to the interface lacking the configuration;
    reduce power consumption of the packet forwarding device by ensuring that the packet forwarding device is powered off in response to determining that the packet forwarding device is idle;
    determine that at least one port included on the interface has been dynamically configured for operation in connection with the packet forwarding device during runtime; and
    power on the packet forwarding device as the interface reboots due at least in part to the interface having been dynamically configured for operation in connection with the packet forwarding device.

17. The system of claim 16, wherein the controller is further programmed to reduce the power consumption of the packet forwarding device by at least one of:
  powering off the packet forwarding device;

refraining from powering on the packet forwarding device; or shutting down one or more features of the packet forwarding device.

18. A method comprising:

searching configuration data that is associated with a plurality of packet forwarding devices and stored in a storage device for an indication of whether an interface communicatively coupled to a packet forwarding device included in the plurality of packet forwarding devices lacks a configuration to handle traffic;

determining, based at least in part on the configuration data, that an additional packet forwarding device included in the plurality of packet forwarding device is configured to handle traffic;

determining, based at least in part on the indication, that the interface lacks the configuration;

determining that the packet forwarding device is idle due at least in part to the interface lacking the configuration;

reducing power consumption of the packet forwarding device by ensuring that the packet forwarding device is powered off in response to determining that the packet forwarding device is idle;

determine that at least one port included on the interface has been dynamically configured for operation in connection with the packet forwarding device during runtime; and power on the packet forwarding device as the interface reboots due at least in part to the interface having been dynamically configured for operation in connection with the packet forwarding device.

\* \* \* \* \*